June 15, 1943.    J. S. TROYER    2,321,877
POULTRY FEEDER
Filed Feb. 20, 1942

J. S. Troyer
INVENTOR.
BY

Patented June 15, 1943

2,321,877

UNITED STATES PATENT OFFICE 2,321,877

POULTRY FEEDER

John S. Troyer, Moyock, N. C.

Application February 20, 1942, Serial No. 431,762

2 Claims. (Cl. 119—53)

This invention relates to poultry feeders of the hopper type, the primary object of the invention being to provide a feeder of this character which may be adjusted to adapt the feeder for use in feeding either chicks, or grown chickens.

An important object of the invention is to provide a feeder including a feed trough from which the chickens obtain the feed, and a hopper mounted above the trough for delivering the feed to the trough, maintaining an adequate quantity of feed in the trough at all times.

Another important object of the invention is the provision of a hopper having adjustable side walls which may be moved various distances from the side edges and the bottom of the trough, so that by regulating the space between the trough and side walls of the hopper and bottom, feed of varying degrees of coarseness, may be effectively fed from the device.

Still another object of the invention is to provide frictional means for supporting the adjustable side walls of the hopper, eliminating any possibility of movement or vibrations of the side walls of the hopper due to wind pressure, or due to the heads of the chicks feeding from the trough, contacting with the side walls of the hopper.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
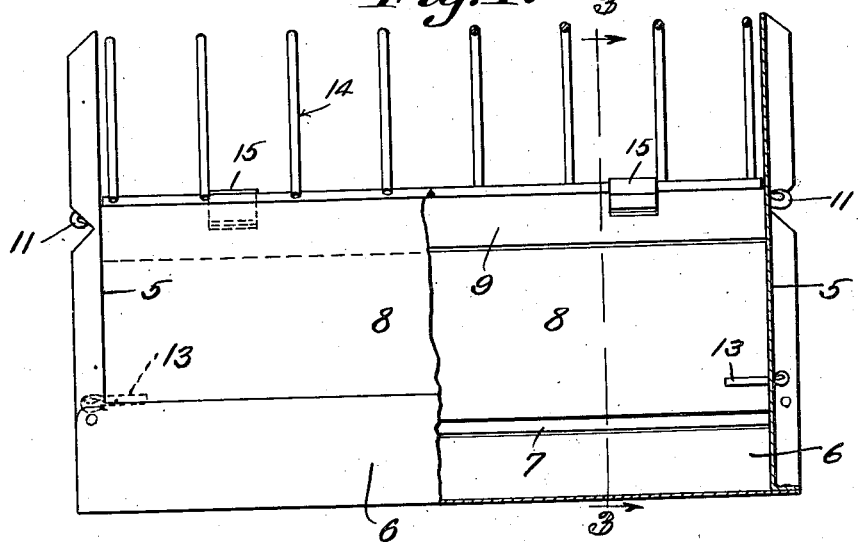
Figure 1 is a side elevational view partly in section, illustrating a hopper constructed in accordance with the invention.
Figure 2:
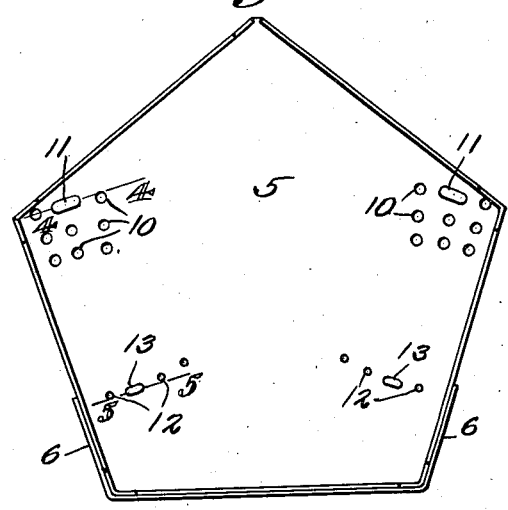
Figure 2 is an end elevational view of the hopper.
Figure 3:
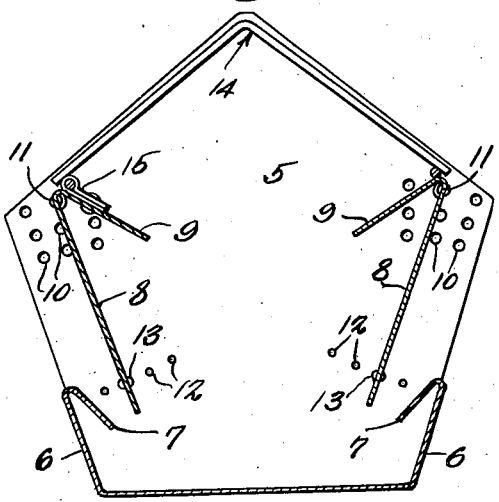
Figure 3 is a sectional view taken on line 3—3 of Figure 1.
Figure 4:
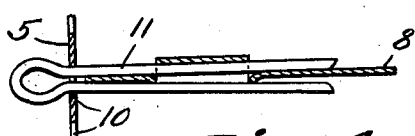
Figure 4 is an enlarged sectional view taken on line 4—4 of Figure 2.
Figure 5:
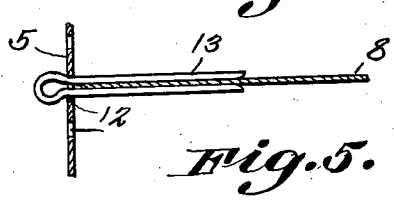
Figure 5 is a sectional view taken on line 5—5 of Figure 2.

Referring to the drawing, the feeder comprises a body portion in the form of a trough, which includes end members 5 and side walls 6, the end members extending appreciable distances above the upper edges of the side walls 6, providing the end walls of the hopper, as well as the end walls of the feed trough.

The upper edges of the side walls 6 of the trough, are extended inwardly and downwardly, providing guard flanges 7 that extend throughout the length of the side walls 6, to prevent the chicks from throwing the feed from the trough, while they are picking or feeding on the material held within the trough.

The side walls of the hopper of the feeder, are indicated by the reference character 8, the side walls being of widths to extend the entire distance between the end members 5, the heights of the side walls being such that the upper edges of the side walls will extend appreciable distances above the upper edges of the side walls 6 of the trough. The side walls 8 embody plates, constructed of sheet metal material, which have their upper edges turned inwardly and downwardly, providing guard flanges 9 that prevent the chickens feeding from the top of the hopper, throwing the feed from the hopper.

These side walls 8 are removable and adjustable, the lower edges of the side walls 8 being supported in spaced relation with the bottom of the hopper, so that the feed contained in the hopper, will find its way into the space between the side walls 8 of the hopper, and the side walls of the trough, where the feed will be accessible to chicks feeding from the trough.

A plurality of openings indicated at 10, are arranged in rows, in the end members 5, and near the side edges of the members 5. These openings afford bearings for yieldable fastening members 11 that are secured adjacent to the upper corners of the side walls 8, by passing one leg of each yieldable fastening member, through spaced slots formed in the side wall of the hopper, associated therewith. One leg of the yieldable fastening member engages the opposite surface of the side wall associated therewith. It will be obvious that when it is desired to increase the slope of the side walls 8, the yieldable fastening members 11 may be shifted to openings near the center of the end members 5. A plurality of openings 12 are formed in the end members 5, near the lower edges thereof, the openings 12 being designed to receive the yieldable fastening members 13, that are secured to the side walls 8, adjacent to the lower edge thereof.

The usual guard 14 is secured by means of hinges 15, to one of the side walls 3, so that when an adjustment is made, the guard member will be automatically adjusted.

From the foregoing it will be obvious that when the feeder is to be used in feeding chicks, the side walls 8 of the hopper are adjusted so that the lower ends thereof will lie in proper spaced relation with the free edges of the flanges 7, permitting access to the feed moving into the trough. The distance between the side walls 8 and flanges 7, is regulated, according to the grade of coarseness of the material being fed.

When the feeder is to be used in feeding full grown chickens, the side walls 8 are adjusted so that the lower portions thereof will lie against the free edges of the flanges 7, closing the compartment which is provided only when feeding chicks from the device. The grown chickens may now obtain the feed through the upper portion of the hopper. With this construction, it is unnecessary to raise and lower the feeder, to adapt it for use in feeding chicks or grown chickens, thereby greatly reducing the cost of constructing the feeder, since it is common practice in feeder construction, to provide adjustable supports for the feeder, in which case it is necessary to adjust the feeder within its supports.

Having thus described the invention, what is claimed is:

1. In a poultry feeder, a trough including side members, the upper edges of the side members being inclined inwardly and downwardly providing broad flanges, end members rising appreciable distances above the trough, a hopper adapted to feed material to the trough, said end members providing the ends of the hopper, wide side walls forming a part of the hopper and disposed between said end members, the upper edges of the side walls being extended inwardly and downwardly providing guard flanges, and means for mounting the side walls of the hopper for vertical and lateral adjustment with respect to the sides of the trough.

2. In a poultry feeder, a trough including side members, the upper longitudinal edges of the side members being inclined inwardly and downwardly, providing broad guard flanges, end members rising appreciable distances above the side members, a hopper adapted to feed material to the trough, said end members providing the ends of the hopper, wide side walls disposed between the end members and providing the sides of the hopper, the upper longitudinal edges of the side walls being extended inwardly and downwardly providing guard flanges, said hopper being open at its top providing an upper feed trough, and means for adjustably mounting said side walls.

JOHN S. TROYER.